UNITED STATES PATENT OFFICE.

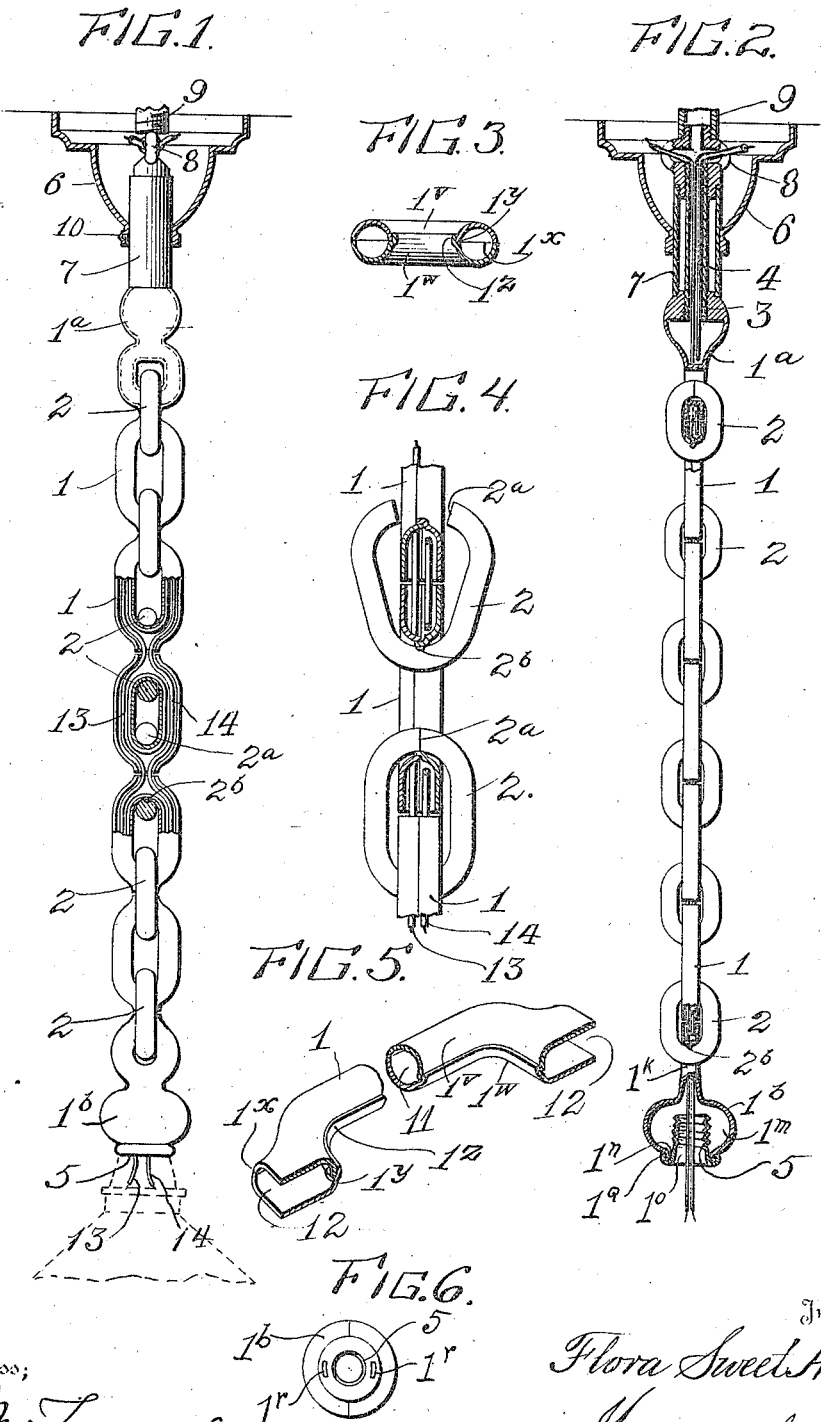

FLORA SWEET ALDEN, OF BOSTON, MASSACHUSETTS.

CONCEALED-WIRE CHAIN.

1,233,538.

Specification of Letters Patent.

Patented July 17, 1917.

Application filed November 6, 1915. Serial No. 60,111.

*To all whom it may concern:*

Be it known that I, FLORA S. ALDEN, a citizen of the United States, residing at Boston, in the county of Suffolk and State of Massachusetts, have invented certain new and useful Improvements in Concealed-Wire Chains, of which the following is a specification.

This invention relates to chains for supporting electric fixtures provided with a conductor or conductors concealed within them, and particularly to chains of this class which are built up of two kinds of links, to wit, conduit or hollow links, through which the conductors may be threaded, and solid, or binder links, alternating in position with the conduit links; the conduit links being so related in series, with their opposed openings in their ends, that the conductors may pass from one conduit link to the next, notwithstanding the solid or binder link alternated in position with and connecting the same. For the preservation of esthetic characteristics without detracting from the practical efficiency of the device as a support having the essential characteristics of a flexible linked chain, I have heretofore provided the end-openings of the conduit links with projecting flanges that reduce to a minimum, the exposure space to be bridged by the wires in passing from one conduit link to the next, and made these flanges of such dimensions that they lie within the thickness of the binder links and are thus concealed, and leave the structure closely simulating a suspension chain without wires. The present invention relates to economical production of the conduit links, mainly, and incidentally, the solid links as well, and accordingly, one feature consists in producing the conduit or hollow links from two halves separated in the intermediate plane passing longitudinally of the link through both branches of the conduit, so that they can be made by stamping them up from sheet metal, and uniting such halves by having them abut around their external perimeters, but having their inner peripheries meet with overlapping flanges, of which the innermost one is expanded over the other in a manner to firmly tie the halves together, and provide through said expanded and innermost flange, a bearing for the binder link. Another feature consists in making the connecting or binder links open at one end and securing them in interlocked position, each with two adjacent conduit links, by merely pressing their open ends to closed position, and to facilitate this last step, the solid links are not only annealed to prevent springing open after closing their open ends, but they are nicked at the intermediate points of their continuous ends to localize bending at the unbroken end, and avoid mis-shaping the sides, and also to leave a centering notch for the conduit link, and thus keep the chain straight when in suspension. While the wire-receiving links have their open ends brought into virtual communication, they are sufficiently separated to permit range of relative movement required to lend flexibility to the chain as a whole.

The invention will be fully understood upon reference to the accompanying drawing, in which—

Figures 1 and 2 are two views at right angles to each other, each showing the subject matter of the present invention partly in section;

Fig. 3 is an enlarged transverse section of a conduit link;

Fig. 4 is an enlarged sectional detail view in the same plane as Fig. 2; and

Fig. 5 is a perspective view of fragments of a conduit link partly in section.

Fig. 6 is an end view of an end conduit link of preferred construction.

The chain comprises two kinds of links, namely, conduit links 1 and connecting or binder links 2; the end conduit links being respectively adapted for attachment to the outlet or other support at top and to the electric fixture at bottom, for which purpose upper end-links $1^a$ are provided with a screw thread 3 to receive the nipple 4, while lower end-links $1^b$ are provided with a male screw thread 5, to receive the attaching portion of an electric fixture, as suggested by dotted lines. In Figs. 1 and 2, 6 represents a canopy, at top, mounted to have a limited slip upon the sleeve 7, which surrounds the nipple 4, so as to give access to a coupling 8, which is adapted for connection with the house pipe 9. The coupling 8 has a bore at top and bottom, but is open on the sides in order to permit uniting the wires with the house wiring. The sleeve 7 is secured between the coupling 8 and the upper link $1^a$, and the canopy 6 is fixed upon said sleeve by a screw 10.

Links 1 are made to provide conduits 11 on their opposite sides, communicating with end-openings 12, by striking them up from sheet metal, in corresponding halves separated in a plane running longitudinally through both conduits; said halves being in abutment around their outer peripheries as at $1^x$, and having overlapping flanges $1^y$, $1^z$, at their inner peripheries, of which the innermost flange $1^z$ is expanded over the conforming flange $1^y$ and thus interlocks the halves together, besides forming a seating for the binder links. These conduit links are held together by the intermediate connecting links 2 in such manner that the end openings 12 of the conduit are made to approximately communicate, though sufficiently spaced apart to avoid undue restriction in the flexibility of the chain. Thus not only can a wire or wires, such for instance as indicated at 13 and 14, be readily passed through a link 1, but said links can be successively threaded upon the wire or wires until sufficient links have been accumulated to make the desired length of chain, after which the intermediate or mechanically connecting links 2 are assembled with the wired links.

In constructing an end link, for instance the lower end link $1^b$, in accordance with the above-described method, the halves are shaped to provide a bulb $1^m$ terminating in a flanged axial opening $1^n$, to which is fitted a bushing $1^o$ having an external flange $1^q$ rolled around the flange of the opening $1^n$; the flange of the opening being also provided with lugs $1^r$ that protrude through and are riveted in the flange of the bushing $1^o$ so as to prevent the bushing from turning in the bulb when the attachment is screwed in or out. By this construction, the end link is sustained against splitting, and a firm but light and cheap construction is insured which is in keeping with the other elements of the chain.

The links 2 are the only links that need be dissected or opened for assembling the chain. While these may be made of any desirable form without departing from my invention, however, I prefer that they are merely opened at one end, as at $2^a$, and made of annealed or non-resilient metal that permits them to be closed together without springing open, and each of said binder links is preferably provided with a nick $2^b$ at its continuous end that insures the binding together of the parts making up the link members 1 at that point, and thus avoids misshaping of the sides, besides leaving a notch or seat for the conduit link. The links 2 are of such internal dimension as to support the wired links in the proper relations to each other and transmit the load from one wired link to the next without imposing any strain upon the contained wires. The end openings in the conduit links are of such dimensions as to lie between the planes of the outer faces of the connecting links and to be thereby concealed in one view of the chain.

I claim:—

1. A concealed wire chain comprising a series of alternate conduit links having alined openings through which a wire may pass from one to another, and intermediate connecting links; said conduit links being divided by a longitudinal plane passing through both conduits, and thereby producing two halves, having inner and outer peripheries, and being suitably interlocked; said outer peripheries being in abutment and said inner peripheries being overlapped in a manner to provide an endless seam.

2. A concealed wire chain comprising a series of alternate conduit links having alined openings through which a wire may pass from one to another, and intermediate connecting links; said conduit links being divided by a longitudinal plane passing through both conduits, and thereby producing two halves, having inner and outer peripheries, and being suitably interlocked; said outer peripheries being in abutment and said inner peripheries being overlapped in a manner to provide an endless seam, the innermost periphery expanded over the one adjacent thereto.

3. A hollow link for chains of substantially the character described, having a loop for engaging an adjacent link, and an end opening to receive a fixture element; said chain comprising two portions abutting in a longitudinal plane, and a nipple applied to the end opening and having an out-turned flange interlocking with the wall of the end opening of the link and resisting separation of the halves of said link.

4. A hollow link for chains of substantially the character described, having a loop for engaging an adjacent link, and an end opening to receive a fixture element; said chain comprising two portions abutting in a longitudinal plane, and a nipple applied to the end opening and having an out-turned flange interlocking with the wall of the end opening of the link and resisting separation of the halves of said link; said nipple being protruded within the hollow link and sustaining the wall of said opening within as well as without.

5. A hollow link for chains of substantially the character described, having a loop for engaging an adjacent link, and an end opening to receive a fixture element; said chain comprising two portions abutting in a longitudinal plane, and a nipple applied to the end opening and having an out-turned flange interlocking with the wall of the end opening of the link and resisting separation of the halves of said link; said nipple being protruded within the hollow link and sustaining the wall of said opening within as well as without; said nipple being threaded and the wall of the end opening being provided with lugs protruding into and interlocking the nipple with the link to resist relative turning between them.

6. In a chain of substantially the character described, a link comprising a loop adapted to embrace an adjacent link and an end having an axial opening adapted to receive a fitting to be connected through means of said opening; said link being constructed of two halves divided by a longitudinal plane and interlocked by overlapping peripheries on said halves, and having a bushing fitted in the axial opening of the link and interlocking with the walls of said opening and securing the halves against separation.

The foregoing specification signed at Boston, Massachusetts, this sixteenth day of October, 1915.

FLORA SWEET ALDEN.

Copies of this patent may be obtained for five cents each, by addressing the "Commissioner of Patents, Washington, D. C."